(12) United States Patent
Amirkhany et al.

(10) Patent No.: US 8,817,184 B1
(45) Date of Patent: Aug. 26, 2014

(54) POINT TO MULTI-POINT CLOCK-FORWARDED SIGNALING FOR LARGE DISPLAYS

(71) Applicant: Samsung Display Co., Ltd., Yongin (KR)

(72) Inventors: Amir Amirkhany, Sunnyvale, CA (US); Nasrin Jaffari, Sunnyvale, CA (US)

(73) Assignee: Samsung Display Co., Ltd., Yongin (KR)

( * ) Notice: Subject to any disclaimer, the term of this patent is extended or adjusted under 35 U.S.C. 154(b) by 0 days.

(21) Appl. No.: 14/180,243

(22) Filed: Feb. 13, 2014

Related U.S. Application Data

(60) Provisional application No. 61/845,854, filed on Jul. 12, 2013.

(51) Int. Cl.
*H04N 5/04* (2006.01)
*H04N 5/38* (2006.01)
*H04N 5/44* (2011.01)
*H04N 17/00* (2006.01)

(52) U.S. Cl.
CPC .................................. *H04N 5/04* (2013.01)
USPC ........... 348/536; 348/537; 348/723; 348/725; 348/194

(58) Field of Classification Search
USPC .................. 348/536, 723–726, 194, 537, 497
IPC .................. H04N 17/00,7/00, 5/04, 5/38, 5/40, H04N 5/44
See application file for complete search history.

(56) References Cited

U.S. PATENT DOCUMENTS

| 2005/0099374 | A1 | 5/2005 | Sagawa | |
|---|---|---|---|---|
| 2006/0158517 | A1* | 7/2006 | Mori et al. | 348/194 |
| 2010/0118206 | A1* | 5/2010 | Gao et al. | 348/723 |

FOREIGN PATENT DOCUMENTS

| KR | 2012-0022470 | 3/2012 |
|---|---|---|
| KR | 2012-0078957 | 7/2012 |

* cited by examiner

*Primary Examiner* — Sherrie Hsia
(74) *Attorney, Agent, or Firm* — Christie, Parker & Hale, LLP

(57) ABSTRACT

A system for forwarding a sample rate clock along with data. In one embodiment, a sample rate clock is sent by a transmitter, along with data, to one or more receivers. The receivers sample the received data using the received sampling clock. Delay adjust circuits in the transmitter adjust the delay of each transmitted data stream using delay error sensing and correction implemented in a back channel between the receivers and the transmitter.

20 Claims, 5 Drawing Sheets

POINT TO MULTI-POINT CLOCK-FORWARDED SIGNALING FOR LARGE DISPLAYS

CROSS-REFERENCE TO RELATED APPLICATION(S)

The present application claims the benefit of Provisional Application No. 61/845,854, filed Jul. 12, 2013, entitled "POINT TO MULTI-POINT CLOCK-FORWARDED SIGNALING FOR LARGE DISPLAYS" the entire content of which is incorporated herein by reference.

FIELD

The following description relates to signaling and more particularly to a system for transmitting a sample-rate clock along with digital data from a transmitter to one or more receivers.

BACKGROUND

In some digital displays such as televisions, data must be transmitted within the display panel, e.g., display data may be transmitted from a timing controller on a printed circuit board (PCB) behind the display panel to driver integrated circuits (ICs) on the display panel. In such an implementation, each driver IC requires a clock signal, i.e., a receiver clock, which may also be referred to as a sampling clock, to sample the received data.

A sampling clock may be extracted, by the driver IC, from the transitions embedded in the data sequence, a process that may require a clock and data recovery circuit (CDR) at the receiver, and a form of transition encoding on the transmitted data, to insure that transitions in the received data are sufficiently frequent. In another kind of implementation, the driver ICs receive a low-frequency clock from the transmitter, and use a phase-locked loop (PLL) to multiply the clock frequency to the required rate for sampling the received data.

Transmitter clock jitter may result in irregularity in the timing of transitions in the transmitted data. It may also result in irregularity in the timing of edges in the transmitted clock, if a clock is transmitted. In CDR-based or PLL-based receivers, due to inherent low-pass filtering in the CDR or PLL, the correlation between high-frequency clock jitter and data jitter may be significantly reduced. This may result in changes in timing margin, as illustrated in FIG. 1A, in which timing margin is defined as the time interval between a clock edge and the subsequent transition in the received data. Such changes in timing margin may limit the maximum data rates achievable with acceptably low error rates. If, on the other hand, the receiver clock jitter were fully correlated with the received data's jitter, the effects of timing jitter would be cancelled.

An intra-panel interface, e.g., the interface between a timing controller (TCON) and driver ICs in a display may be asymmetric in the sense that the receivers, i.e., the driver ICs, are noisy, because they include high-voltage display column drivers, and the driver ICs are slow, because they are fabricated in a high-voltage process, while the transmitter, i.e., the TCON, is fabricated in a standard process with standard voltages, and is therefore quieter and faster. As a result it is desirable to place precision circuitry in the transmitter rather than in the receiver, when possible.

Thus, there is a need for a system and method for providing a clock signal to several receivers which preserves the correlation between clock jitter and data jitter, and which is implemented primarily in the transmitter.

SUMMARY

In one embodiment of a system for forwarding a sample rate clock along with data, a sample rate clock is sent by a transmitter, along with data, to one or more receivers. The receivers sample the received data using the received sampling clock. Delay adjust circuits in the transmitter adjust the delay of each transmitted data stream using delay error sensing and correction implemented in a back channel between the receivers and the transmitter.

According to an embodiment of the present invention there is provided a system for transmitting data, the system including: a transmitter including: a plurality of data output circuits, each of the plurality of data output circuits including a delay adjust circuit, the plurality of data output circuits being configured to operate at a data rate; and a sampling clock output circuit configured to output a sampling clock signal with a total sampling clock edge rate equal to the data rate, and a plurality of receivers, each of the plurality of receivers connected to a corresponding one of the plurality of data output circuits, each of the plurality of receivers including: a sampling clock input connected to the sampling clock output circuit; a data input circuit; and a receiver output, a back channel connected to a receiver of the plurality of receivers, and to the delay adjust circuit of the corresponding data output circuit, the back channel configured to: measure a delay error in the receiver; and adjust a delay in the delay adjust circuit of the corresponding data output circuit, to reduce the delay error.

In one embodiment, the delay adjust circuit is configured to be controlled by a digital signal.

In one embodiment, the system is configured to perform a sweep calibration to set the delay in the delay adjust circuit.

In one embodiment, the sweep calibration includes: sending, by the plurality of data output circuits, a sequence of alternating ones and zeros; operating the receiver in a mode in which every other sampling clock edge is disregarded; changing the delay in the delay adjust circuit in increments in a first direction until both, at a first threshold delay, a first pass-fail or fail-pass boundary is reached, and, at a second threshold delay, a second pass-fail or fail-pass boundary is reached; determining, from the first threshold delay and from the second threshold delay, a range of delays corresponding to a pass region; and setting the delay of the delay adjust circuit to a value that is substantially centered in the pass region.

In one embodiment, the system is configured to perform an incremental delay adjustment, starting from an initial delay value.

In one embodiment, the back channel includes a transition detector.

In one embodiment, the incremental delay adjustment includes: sending, by the plurality of data output circuits, a sequence of alternating ones and zeros; operating the receiver in a mode in which every other sampling clock edge is disregarded; increasing the delay, in a first trial delay adjustment, to a value exceeding the initial delay value by an amount corresponding to 90 degrees of sampling clock phase; decreasing the delay, in a second trial delay adjustment, to a value less than the initial delay value by an amount corresponding to 90 degrees of sampling clock phase; setting the delay in the delay adjust circuit to a value exceeding the initial value by an increment when the second trial delay adjustment resulted in a transition at the receiver output; and setting the delay in the delay adjust circuit to a value less than the initial delay value by the increment when the first trial delay adjustment resulted in a transition at the receiver output.

In one embodiment, each of the plurality of receivers includes a crossing clock circuit configured to generate a crossing clock signal having a total crossing clock edge rate equal to the total sampling clock edge rate and offset 90 degrees in phase from the sampling clock signal; and the back channel is configured to measure the delay error in the receiver by determining whether an edge of the crossing clock occurs before or after a transition in a signal received at the data input circuit.

In one embodiment, the receiver includes a clocked comparator.

In one embodiment, the sampling clock inputs of the plurality of receivers are connected to the sampling clock output circuit by a sampling clock splitting tree.

In one embodiment, the sampling clock splitting tree includes a plurality of transmission line splitters, each of the plurality of transmission line splitters having an input at a first characteristic impedance and two outputs at a second characteristic impedance, the second characteristic impedance being twice the first characteristic impedance.

In one embodiment, the sampling clock inputs of the plurality of receivers are connected to the sampling clock output circuit by a fly-by architecture.

In one embodiment, the system includes a plurality of inductors, each of the plurality of inductors connected to a sampling clock input of the plurality of receivers.

In one embodiment, the delay adjust circuit of the corresponding data output circuit is a variable delay line.

In one embodiment, the delay adjust circuit of the corresponding data output circuit is a phase interpolator.

In one embodiment, the sampling clock output circuit includes a phase locked loop.

In one embodiment, the back channel includes a plurality of multiplexers, each of the plurality of multiplexers connected to one of the plurality of receivers.

In one embodiment, the back channel includes a plurality of delay control outputs, each of the delay control outputs connected to one of the delay adjust circuits of the plurality of data output circuits.

In one embodiment, the delay control outputs are digital delay control outputs.

In one embodiment, a video display includes the system, and the system is configured to perform a periodic incremental delay adjustment, starting from an initial delay value and wherein the system is configured to perform the periodic incremental delay adjustment during a blanking interval of the video display.

BRIEF DESCRIPTION OF THE DRAWINGS

These and other features and advantages of the present invention will be appreciated and understood with reference to the specification, claims and appended drawings wherein:

DETAILED DESCRIPTION

The detailed description set forth below in connection with the appended drawings is intended as a description of exemplary embodiments of a system and method for point to multi-point clock-forwarded signaling for large displays provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

Figure 1A:
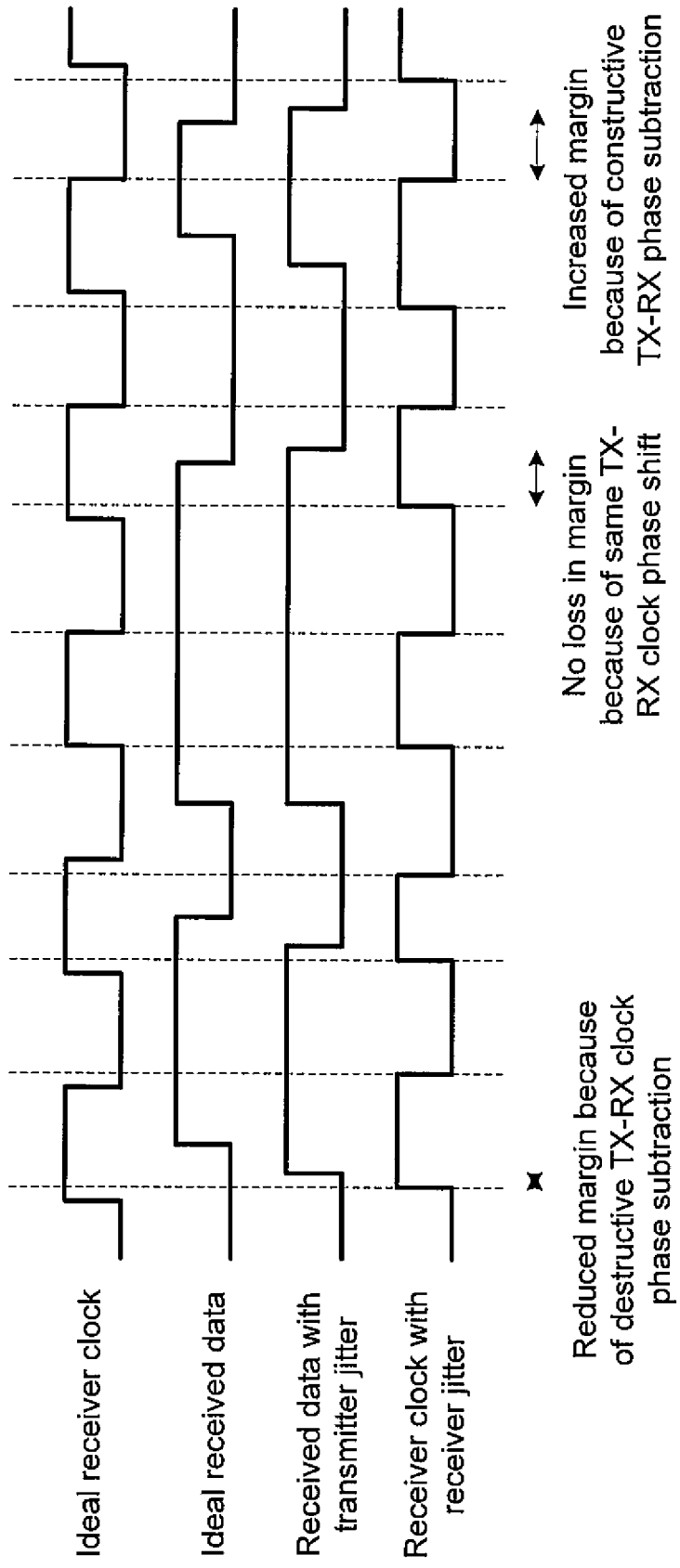
FIG. 1A is a timing diagram showing related art ideal and non-ideal clock and data signals.
Figure 1B:
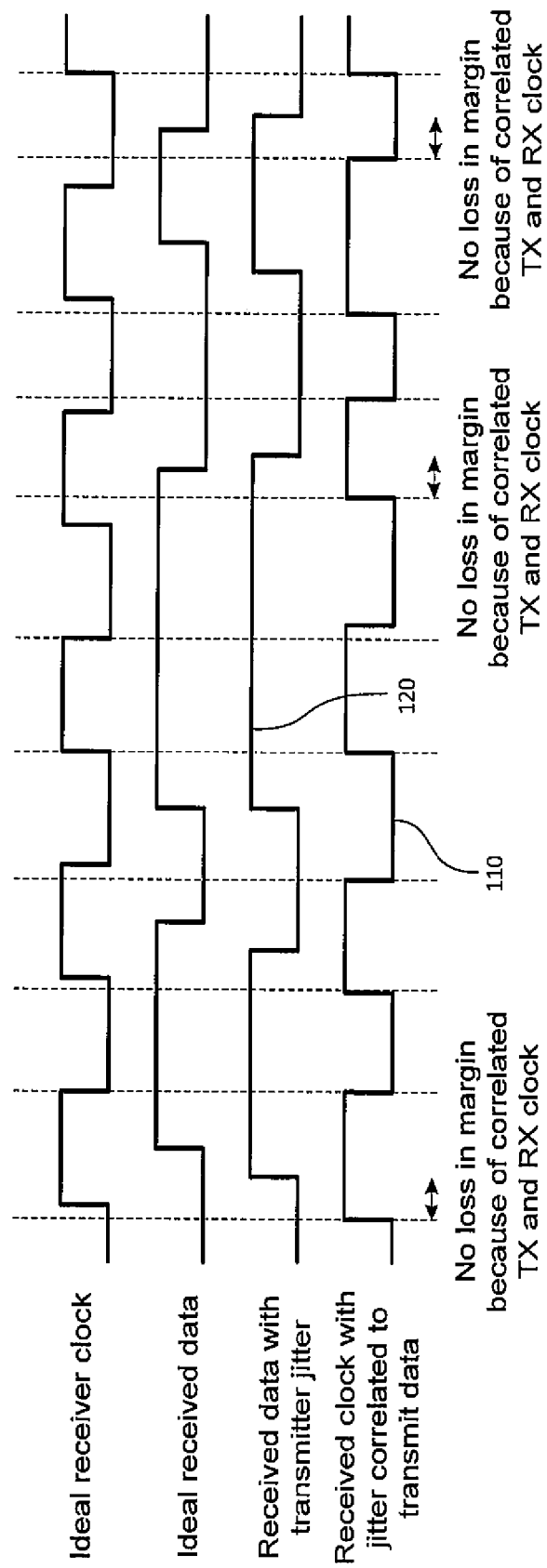
FIG. 1B is a timing diagram showing ideal and non-ideal clock and data signals according to an embodiment of the present invention.

It is an object of embodiments of the present invention to provide a system and method for point to multi-point clock-forwarded signaling that preserves the correlation between sampling clock jitter and data jitter. As illustrated in FIG. 1B, jitter in a sampling clock signal 110 and in a received data signal 120 need not compromise timing margin, if the jitter in the two signals is correlated.

Figure 2:
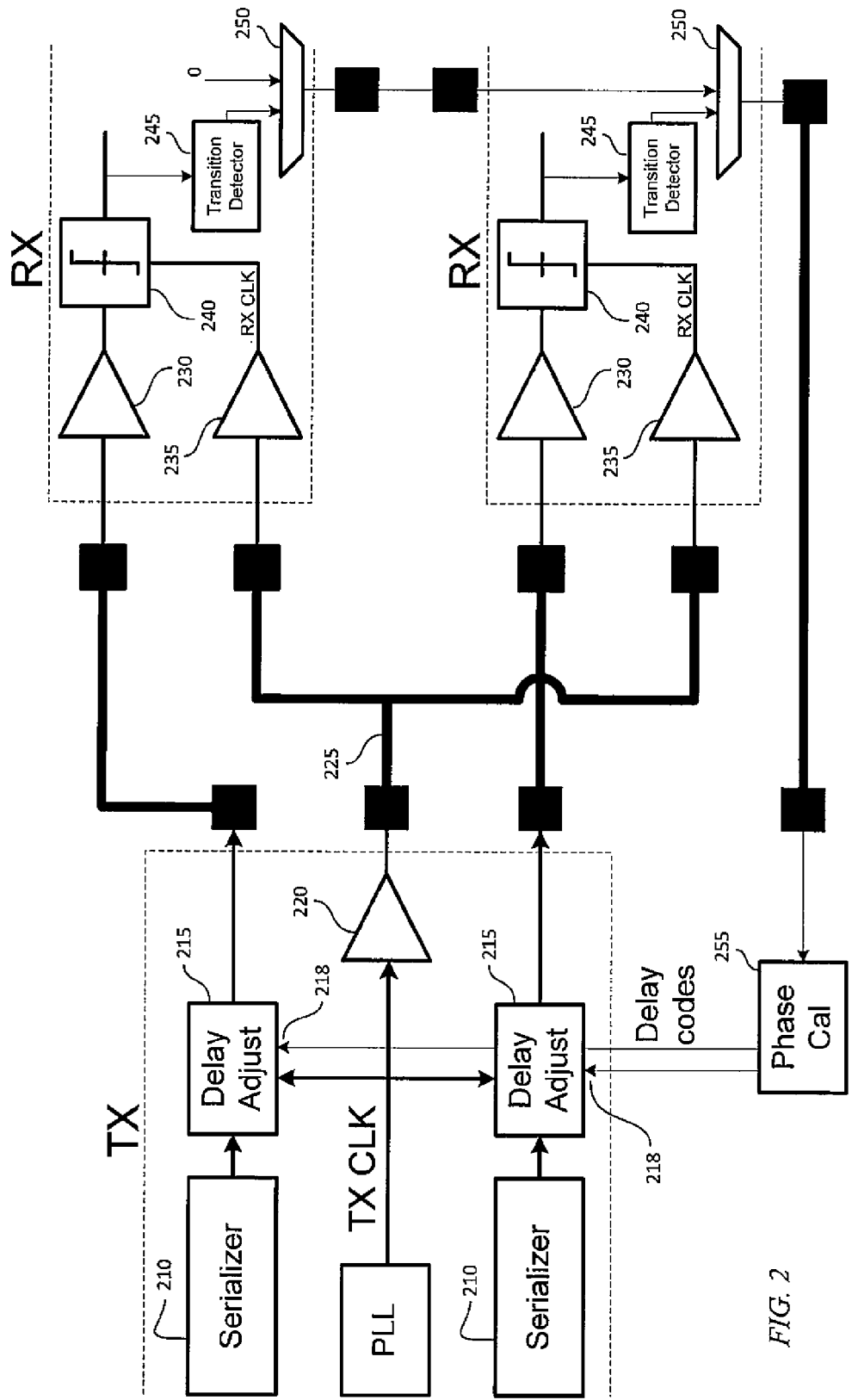
FIG. 2 is a block diagram of a transmitter and several receivers employing a forwarded sample-rate clock according to an embodiment of the present invention.

Referring to FIG. 2, this is accomplished in one embodiment by transmitting, from the transmitter, a sample-rate clock along with the transmitted data. A sample rate clock, as used herein, refers to a clock signal that has one edge for each bit of transmitted data, and may therefore be used in the receiver to trigger sampling of the data. A sample rate clock is distinguished in this respect from a low-rate clock, which must be converted to a sample rate clock, e.g., by a PLL, before it can be used to trigger sampling of the data.

In the embodiment of FIG. 2, a transmitter TX includes two data channels and a transmitter clock channel, the data channels each including a serializer 210 and a delay adjust circuit 215. Each delay adjust circuit is configured to delay the data signal by a variable amount, in fixed increments of delay, the amount of delay being controlled by a delay code, i.e., a digital delay command, received at a delay control input 218. The clock channel includes a PLL which generates a sample rate sampling clock, and a clock line driver 220 for driving the sampling clock line 225. Two receivers RX are connected to receive data from the two data channels, respectively, and each receiver RX is also configured to receive the sampling clock signal. Each receiver includes a data amplifier 230, a clock amplifier 235, and a clocked comparator 240, which may also be referred to as a slicer. Two transmitter data channels and two receivers RX are shown in FIG. 2 but the invention is not limited to this configuration, and the invention may be employed in an analogous manner with an arbitrary number of transmitter data channels and receivers RX.

A controller referred to as a back channel is employed to determine a delay adjust setting for each data channel at which the timing margin is acceptable for the received data and clock signals at each receiver. In one embodiment the back channel includes a transition detector 245 and a multiplexer 250 for each receiver, and a phase calibration circuit 255, which controls the delay adjust circuit 215 in each transmitter data channel.

In operation, the back channel is used to measure the delay error in each receiver, i.e., the difference between the data delay being applied in the corresponding transmitter data channel and the data delay which would result in ideal timing margin in the receiver. The back channel is also used to adjust, via the phase calibration circuit 255, the data delay in each transmitter data channel, so as to bring the value of the data delay closer to the desired value. This may be accomplished by any, or a combination of, several different methods.

In one embodiment, a sweep calibration is used to set the value of each delay adjust circuit 215. In this calibration method, one of the transmitter data channels is set to a mode in which a stream of data composed of alternating ones and zeros, i.e., a square wave with the same frequency as the sampling clock, is transmitted, and the clocked comparator 240 of the corresponding receiver RX is set to a mode in which every other clock edge is disregarded, i.e., only rising clock edges or falling clock edges are used, whereas during normal operation the received data may be sampled at each received clock edge, rising or falling.

The data signal delay is then adjusted, by sending appropriate commands from the phase calibration circuit 255 to the delay adjust circuit 215, in increments in a first direction, increasing or decreasing, until, at a first threshold delay, a first pass-fail or fail-pass boundary is reached. The receiver RX corresponding to the delay being adjusted is selected by appropriate setting of the multiplexers 250. A transition detector, the output of which is one when the output of the transmitter has changed in the last time step and zero otherwise, may be used to communicate to the phase calibration circuit 255 when a pass-fail or fail-pass boundary is reached. The increments in which the data signal delay is adjusted may be the smallest delay increment by which the delay adjust circuit 215 is capable of being adjusted, or it may be a larger increment. Whether a particular data signal delay is in a passing region or a failing region in the set of possible delay settings is determined by whether the received data is the same as or different than the transmitted data, when the same clock edge is used to sample the data. For example, if the receiver is configured to disregard falling clock edges and the timing at the transmitter TX of the sampling clock and the stream of data composed of alternating ones and zeros is such that the transmitter is transmitting a one at each rising clock edge, then the delay is in a passing region in the set of possible delay settings if the clocked comparator 240 receives a stream of ones, and in a failing region in the set of possible delay settings if the clocked comparator 240 receives a stream of zeros. A pass-fail boundary, as used herein, refers to a delay value at which, as the delay is adjusted during the sweep calibration, the delay transitions from a passing region to a failing region, in the set of possible delay settings. Similarly, a fail-pass boundary, as used herein, refers to a delay value at which, as the delay is adjusted during the sweep calibration, the delay transitions from a failing region to a passing region, in the set of possible delay settings. In this context failing and passing are defined in terms of the clock and data transmitted by the transmitter. For example, if the transmitter is transmitting a 101010 pattern and the receiver is sampling every other bit, the receiver may define a passing region as one at the center of which the positive edge of the received clock is centered in the "1" bits in the sequence. In this example, sampling a "0" would be interpreted as indicating that the delay value is in a failing region.

After the first threshold delay is reached, the delay is further adjusted in the first direction until, at a second threshold delay, a second pass-fail or fail-pass boundary is reached. If the first pass-fail or fail-pass boundary was a pass-fail boundary, then the second pass-fail or fail-pass boundary is a fail-pass boundary, and the delay values in the region between the first threshold delay and the second threshold delay are in a failing region. Conversely, if the first pass-fail or fail-pass boundary was a fail-pass boundary, then the second pass-fail or fail-pass boundary is a pass-fail boundary, and the delay values in the region between the first threshold delay and the second threshold delay are in a passing region. In the latter case, the delay may be set, at the end of the sweep calibration, to a value in the center of the passing region between the first threshold delay and the second threshold delay. In the former case, the regions on either side of the region between the first threshold delay and the second threshold delay are both passing regions, and the delay may be set to a value that extends into either of these regions by one-half of the delay difference between the first threshold delay and the second threshold delay.

More generally, identifying the first threshold delay and the second threshold delay makes it possible to calibrate both the slope and the offset of the mapping between the delay codes sent to the delay adjust circuit, which may generally be in arbitrary units, and the data delay, in units of clock phase. Once the delay codes corresponding to the first threshold delay and the second threshold delay have been found, their difference is the change in the delay code needed to impart a change in delay corresponding to 180 degrees of clock phase, and the slope of delay in units of clock phase with respect to delay code units is known. The delay code corresponding to either threshold delay provides the offset, in the mapping from delay codes to data delay, at which the data transitions are aligned with clock edges.

Other methods may be used to perform a sweep calibration. For example, a sweep calibration may be performed by adjusting the data delay in a first direction until, at a first threshold delay, a first pass-fail or fail-pass boundary is reached, and then adjusting the data delay in a second direction opposite the first direction until, at a second threshold delay, a second pass-fail or fail-pass boundary is reached. In another example, a sweep calibration may be performed by adjusting the data delay in a first direction until a fail-pass boundary is reached, followed by a pass-fail boundary, so that the region between the two boundaries is a passing region, and the delay may be set to the center of the region.

Another method for adjusting the data delay proceeds as follows, in one embodiment. One of the transmitter data channels is set to a mode in which a stream of data composed of alternating ones and zeros, i.e., a square wave with the same frequency as the sampling clock, is transmitted, and the clocked comparator 240 of the corresponding receiver RX is set to a mode in which every other clock edge is disregarded, i.e., only rising clock edges or falling clock edges are used. The receiver RX corresponding to the delay being adjusted is selected by appropriate setting of the multiplexers 250. The delay is then increased, from the initial delay, by an amount corresponding to 90 degrees of clock phase, and then decreased, from the initial delay, by an amount corresponding to 90 degrees of clock phase. If the delay is longer than desired, this process results in a crossing of a pass-fail boundary when the delay is increased; if the delay is shorter than desired, a pass-fail boundary is crossed when the delay is decreased. Boundary crossings may be detected by the transition detector 245 in the receiver corresponding to the data delay being adjusted. The phase calibration circuit may then adjust the operating delay to be shorter or longer, respectively, than the initial delay, by a small increment of delay. In related embodiments, the delay may instead be decreased first, and then increased, when testing for the crossing of a pass-fail boundary.

Figure 3:
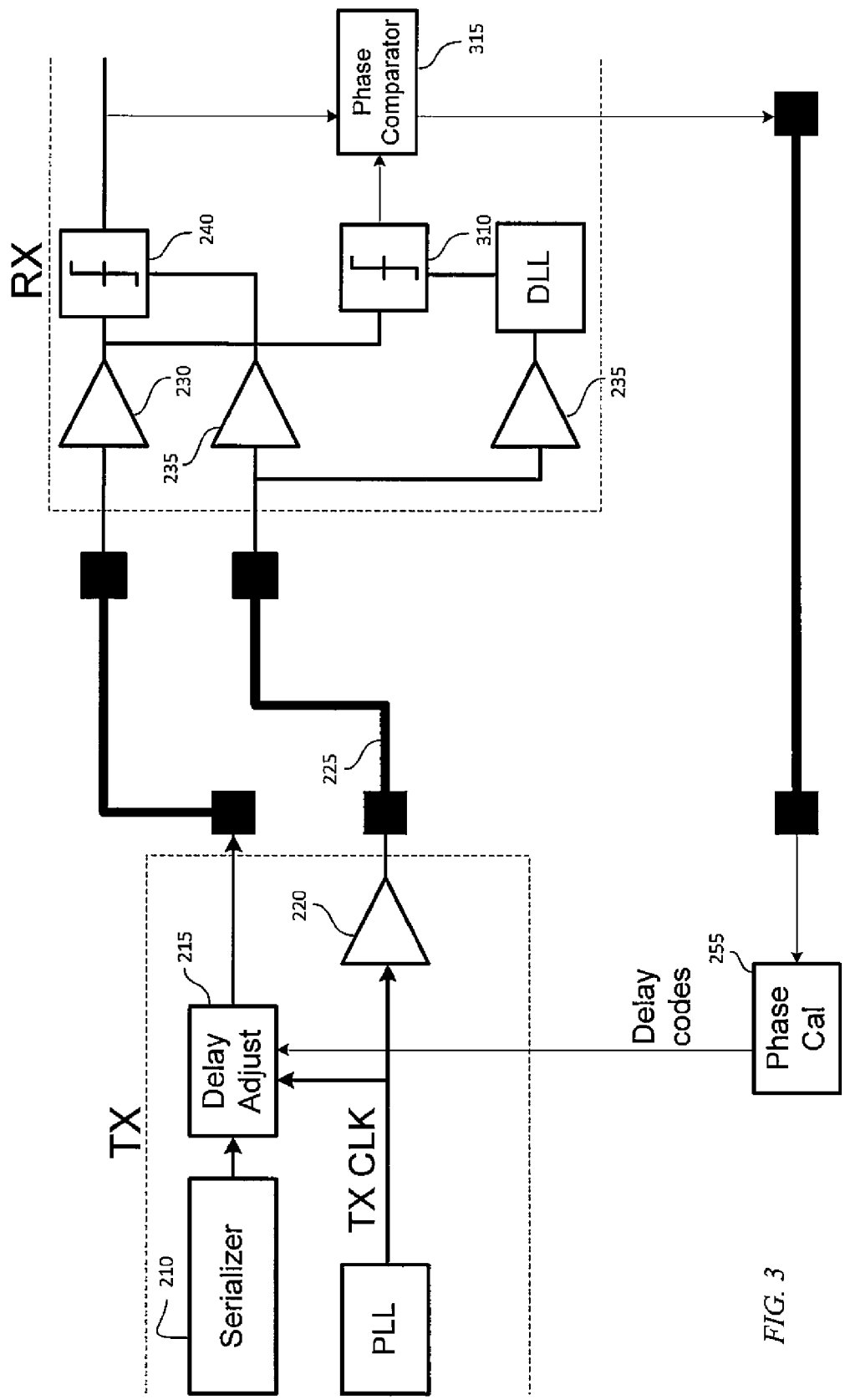
FIG. 3 is a block diagram of a transmitter and a receiver employing a forwarded sample-rate clock according to another embodiment of the present invention.

Referring to FIG. 3, in another embodiment, the data delay is adjusted during normal operation, i.e., without interrupting the operation of the transmitter and receiver by transmitting a stream of data composed of alternating ones and zeros. The receiver is configured to generate from the received sampling clock, using a delay-locked loop (DLL), a crossing clock which has the same frequency as the sampling clock but is offset in phase by 90 degrees from the phase of the sampling clock. Thus, if the timing at any receiver is ideal, and data transitions occur half-way between sampling clock edges, the data transitions will occur at the same time as crossing clock edges. The data in a receiver may then be sampled by two parallel clocked comparators, a first comparator 240 clocked by the sampling clock and a second comparator 310 clocked by the crossing clock. The outputs may then be combined in a configuration referred to as a bang-bang phase comparator 315. In particular, if the comparator 310 clocked by the crossing clock detects a one, between samples, in the comparator 240 clocked by the sampling clock, differing by a rising edge, it may be inferred that the data delay is too small and the phase calibration circuit 255 may increase it by a small increment. Conversely, if the comparator 310 clocked by the crossing clock detects a one, between samples, in the comparator 240 clocked by the sampling clock, differing by a falling edge, or if the comparator 310 clocked by the crossing clock detects a zero, between samples, in the comparator 240 clocked by the sampling clock, differing by a rising edge, it may be inferred that the data delay is too great and the phase calibration circuit 255 may decrease it by a small increment. Although FIG. 3 illustrates only one transmitter data channel and one receiver, in general the invention may be practiced according to this embodiment with an arbitrary number of each.

In implementations with multiple receivers, the sampling clock may be distributed to the receivers by various suitable mechanisms. In one embodiment, a clock splitting tree is used. Such a tree may include a number of tees, each having one input and two outputs, at each of which the characteristic impedance of the two output transmission lines is twice the characteristic impedance of the transmission line at the input. In another embodiment a fly-by architecture is used. In this architecture, a single transmission line carrying the clock signal is routed so as to pass near, and be connected to, each of the several receiver clock inputs, which are configured to be high-impedance inputs, so as not to significantly attenuate or reflect the clock signal. Shunt inductors may be connected to the receiver clock inputs if the receiver clock inputs have substantially capacitive input impedance, with the inductance chosen to resonate with the capacitance of the receiver inputs so that at resonance each parallel combination represents a high impedance.

In one embodiment the delay adjust circuit 215 includes a delay interpolator, which is used to generate an arbitrary phase clock signal; this clock signal is then used to re-time the data, so as to impose a variable delay on the data. Four phases of the clock are generated in the delay interpolator, e.g., 0 degrees, 90 degrees, 180 degrees, and 270 degrees, and an arbitrary clock phase is then generated by forming a linear combination of two of the four clock phases, under the control of delay codes received from the phase calibration circuit 255. In other embodiments the delay adjust circuit is constructed from sets of pairs of inverters, each pair adding two propagation delays, and multiplexers selecting the number of inverter pairs through which the data signal propagates.

Use of the sampling clock in the transmitter to time or re-time the transmitted data may impress sampling clock jitter on the data, so that the data jitter and timing clock jitter are correlated as desired. Moreover, certain mechanisms producing additional timing variation may also be common mode between a data signal and the sampling clock, allowing the timing variations to cancel in embodiments of the present invention. For example, temperature fluctuations may affect the delay along the signal path taken by the sampling clock and along the signal path taken by a data signal in substantially the same way, and their effect may be largely canceled.

Figure 4:
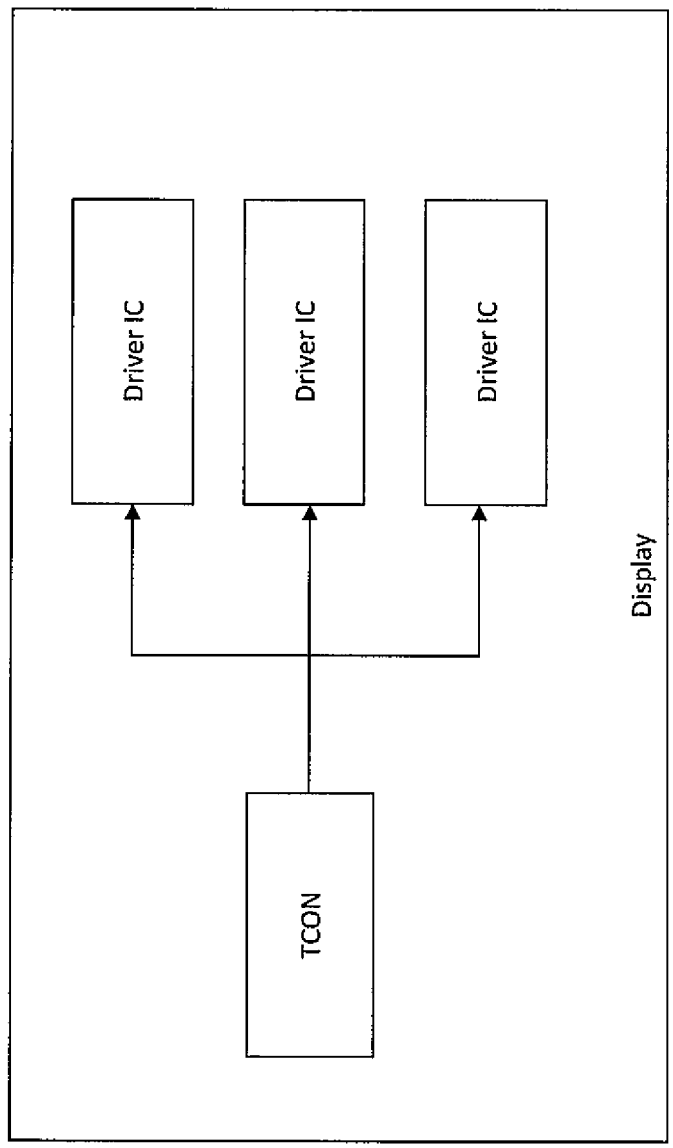
FIG. 4 is a block diagram of a display employing a forwarded sample-rate clock according to an embodiment of the present invention.

FIG. 4 illustrates a digital display, such as an organic light emitting diode display or a liquid crystal display in a television or a cell phone, including a timing controller (TCON) connected to several driver ICs according to an embodiment of the present invention. Although the present invention may be employed to transmit data between components of a display, the invention is not thereby limited, and it may be used in other applications in which data is transmitted from a transmitter to one or more receivers.

Although exemplary embodiments of a system and method for point to multi-point clock-forwarded signaling for large displays have been specifically described and illustrated herein, many modifications and variations will be apparent to those skilled in the art. Accordingly, it is to be understood that a system and method for point to multi-point clock-forwarded signaling for large displays constructed according to principles of this invention may be embodied other than as specifically described herein. The invention is also defined in the following claims, and equivalents thereof.

What is claimed is:

1. A system for transmitting data, the system comprising:
  a transmitter comprising:
    a plurality of data output circuits, each of the plurality of data output circuits comprising a delay adjust circuit, the plurality of data output circuits being configured to operate at a data rate; and
    a sampling clock output circuit configured to output a sampling clock signal with a total sampling clock edge rate equal to the data rate, and
  a plurality of receivers, each of the plurality of receivers connected to a corresponding one of the plurality of data output circuits, each of the plurality of receivers comprising:
    a sampling clock input connected to the sampling clock output circuit;
    a data input circuit; and
    a receiver output,
  a back channel connected to a receiver of the plurality of receivers, and to the delay adjust circuit of the corresponding data output circuit, the back channel configured to:
    measure a delay error in the receiver; and
    adjust a delay in the delay adjust circuit of the corresponding data output circuit, to reduce the delay error.

2. The system of claim 1, wherein the delay adjust circuit is configured to be controlled by a digital signal.

3. The system of claim 1, wherein the system is configured to perform a sweep calibration to set the delay in the delay adjust circuit.

4. The system of claim 3, wherein the sweep calibration comprises:
  sending, by the plurality of data output circuits, a sequence of alternating ones and zeros;
  operating the receiver in a mode in which every other sampling clock edge is disregarded;
  changing the delay in the delay adjust circuit in increments in a first direction until both, at a first threshold delay, a first pass-fail or fail-pass boundary is reached, and, at a second threshold delay, a second pass-fail or fail-pass boundary is reached;
  determining, from the first threshold delay and from the second threshold delay, a range of delays corresponding to a pass region; and setting the delay of the delay adjust circuit to a value that is substantially centered in the pass region.

5. The system of claim 1, wherein the system is configured to perform an incremental delay adjustment, starting from an initial delay value.

6. The system of claim 5, wherein the back channel comprises a transition detector.

7. The system of claim 6, wherein the incremental delay adjustment comprises:

sending, by the plurality of data output circuits, a sequence of alternating ones and zeros;

operating the receiver in a mode in which every other sampling clock edge is disregarded;

increasing the delay, in a first trial delay adjustment, to a value exceeding the initial delay value by an amount corresponding to 90 degrees of sampling clock phase;

decreasing the delay, in a second trial delay adjustment, to a value less than the initial delay value by an amount corresponding to 90 degrees of sampling clock phase;

setting the delay in the delay adjust circuit to a value exceeding the initial value by an increment when the second trial delay adjustment resulted in a transition at the receiver output; and setting the delay in the delay adjust circuit to a value less than the initial delay value by the increment when the first trial delay adjustment resulted in a transition at the receiver output.

8. The system of claim 1, wherein:

each of the plurality of receivers comprises a crossing clock circuit configured to generate a crossing clock signal having a total crossing clock edge rate equal to the total sampling clock edge rate and offset 90 degrees in phase from the sampling clock signal; and the back channel is configured to measure the delay error in the receiver by determining whether an edge of the crossing clock occurs before or after a transition in a signal received at the data input circuit.

9. The system of claim 1, wherein the receiver comprises a clocked comparator.

10. The system of claim 1, wherein the sampling clock inputs of the plurality of receivers are connected to the sampling clock output circuit by a sampling clock splitting tree.

11. The system of claim 10, wherein the sampling clock splitting tree comprises a plurality of transmission line splitters, each of the plurality of transmission line splitters having an input at a first characteristic impedance and two outputs at a second characteristic impedance, the second characteristic impedance being twice the first characteristic impedance.

12. The system of claim 1, wherein the sampling clock inputs of the plurality of receivers are connected to the sampling clock output circuit by a fly-by architecture.

13. The system of claim 1, comprising a plurality of inductors, each of the plurality of inductors connected to a sampling clock input of the plurality of receivers.

14. The system of claim 1, wherein the delay adjust circuit of the corresponding data output circuit is a variable delay line.

15. The system of claim 1, wherein the delay adjust circuit of the corresponding data output circuit is a phase interpolator.

16. The system of claim 1, wherein the sampling clock output circuit comprises a phase locked loop.

17. The system of claim 1, wherein the back channel comprises a plurality of multiplexers, each of the plurality of multiplexers connected to one of the plurality of receivers.

18. The system of claim 17, wherein the back channel comprises a plurality of delay control outputs, each of the delay control outputs connected to one of the delay adjust circuits of the plurality of data output circuits.

19. The system of claim 18, wherein the delay control outputs are digital delay control outputs.

20. A video display comprising the system of claim 1, wherein the system is configured to perform a periodic incremental delay adjustment, starting from an initial delay value and wherein the system is configured to perform the periodic incremental delay adjustment during a blanking interval of the video display.

* * * * *